(12) United States Patent
Hama

(10) Patent No.: US 7,504,462 B2
(45) Date of Patent: Mar. 17, 2009

(54) PROCESS FOR PRODUCING OLEFIN POLYMER

(75) Inventor: Hisakatsu Hama, Chiba (JP)

(73) Assignee: Sumitomo Cheimcal Company, Limited, Tokyo (JP)

( * ) Notice: Subject to any disclaimer, the term of this patent is extended or adjusted under 35 U.S.C. 154(b) by 0 days.

(21) Appl. No.: 12/021,513

(22) Filed: Jan. 29, 2008

(65) Prior Publication Data

US 2008/0182949 A1    Jul. 31, 2008

(30) Foreign Application Priority Data

Jan. 31, 2007  (JP) ............... 2007-021189

(51) Int. Cl.
 *C08F 2/00*   (2006.01)
 *B01J 19/18*  (2006.01)
(52) U.S. Cl. .................. 526/88; 526/919; 422/135
(58) Field of Classification Search .......... 526/88, 526/919; 422/135
See application file for complete search history.

(56) References Cited

U.S. PATENT DOCUMENTS

| | | | | |
|---|---|---|---|---|
| 2,815,334 A | * | 12/1957 | Killey et al. ............ | 526/79 |
| 3,726,845 A | * | 4/1973 | Nickerson .............. | 526/159 |
| 4,438,074 A | * | 3/1984 | Wilt ..................... | 422/135 |
| 4,698,211 A | * | 10/1987 | Storey et al. ........... | 422/135 |
| 6,245,868 B1 | * | 6/2001 | Agapiou et al. ......... | 526/88 |
| 6,398,463 B1 | * | 6/2002 | Morterol ............... | 406/146 |

FOREIGN PATENT DOCUMENTS

JP   9-87328 A   3/1997

\* cited by examiner

*Primary Examiner*—Fred M Teskin
(74) *Attorney, Agent, or Firm*—Sughrue Mion, PLLC

(57) ABSTRACT

Disclosed is to provide a process for producing an olefin polymer by continuous polymerization according to which the transition metal compound and the co-catalyst component promptly contact after they are fed to the polymerization reaction tank. The above process for producing an olefin polymer comprises continuously polymerizing an olefinic monomer in the presence of a polymerization catalyst obtained by contact treatment of a transition metal compound and a co-catalyst component in a polymerization reaction tank in which an agitation shaft having an agitating blade is suspended in the central part of the tank.

3 Claims, 1 Drawing Sheet

PROCESS FOR PRODUCING OLEFIN POLYMER

BACKGROUND OF THE INVENTION

The present invention relates to a process for producing an olefin polymer.

As a process for producing an olefin polymer by continuous polymerization of olefinic monomers in the presence of a polymerization catalyst obtained by subjecting a transition metal compound and a co-catalyst component to contact treatment, such as vanadium catalyst or metallocene catalyst, there is known a process of carrying out continuous polymerization of olefinic monomers in a solvent using a polymerization reaction tank provided with an agitating device. For example, Patent Document 1 shown below discloses a process which comprises continuously feeding a transition metal compound, a co-catalyst component and monomers from the sidewall of a polymerization reaction tank and a solvent from the top of the polymerization reaction tank, copolymerizing ethylene and 1-butene in hexane, and continuously drawing a reaction mixture from the sidewall.

Patent Document 1: JP-A-9-87328

SUMMARY OF THE INVENTION

However, according to the above continuous polymerization process, the transition metal compound and the co-catalyst component are sometimes discharged from the polymerization reaction tank before they sufficiently contact, resulting in decrease of the amount of the polymer produced per unit amount of the catalyst.

Under the circumstances, the object of the present invention is to provide a process for producing an olefin polymer by continuous polymerization according to which the transition metal compound and the co-catalyst component promptly contact after they are fed to the polymerization reaction tank.

The present invention relates to a process for producing an olefin polymer which comprises continuously polymerizing an olefinic monomer in the presence of a polymerization catalyst obtained by contact treatment of a transition metal compound and a co-catalyst component in a polymerization reaction tank in which an agitation shaft provided with an agitating blade is suspended in the central part of the tank, wherein the agitating blade is disposed closing to the bottom part of the polymerization reaction tank, the transition metal compound and the co-catalyst component are respectively fed to the positions of the bottom of the polymerization reaction tank which are at a distance of 0.5×d or less from the center of the agitation shaft where "d" denotes a diameter of the agitating blade, and the agitation is carried out at a Reynolds number for agitation of 100 or more.

The present invention can provide a process for producing an olefin polymer by continuous polymerization according to which the transition metal compound and the co-catalyst component promptly contact after they are fed to the polymerization reaction tank.

DESCRIPTION OF THE PREFERRED EMBODIMENTS

Known reactors can be used as the polymerization reaction tanks in the present invention. The shape of the polymerization reaction tank may be polygonal, cylindrical, etc., and cylindrical reaction tank is preferred from the point of agitating efficiency.

In the polymerization reaction tank, an agitation shaft provided with an agitating blade is suspended in the central part of the tank, and the agitation shaft can be rotated by a driving source outside the tank.

Figure 1:
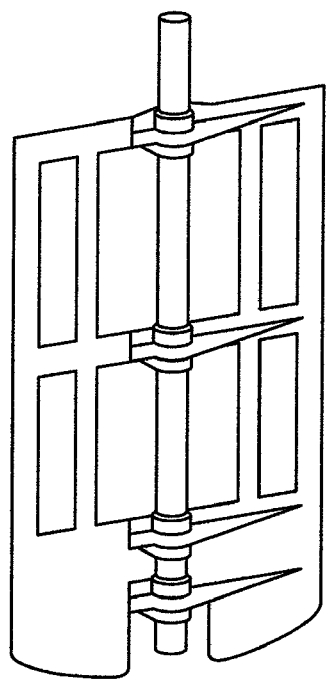
FIG. 1 shows Max Blend blade (trademark: manufactured by Sumiju Kiki System Co., Ltd.)
Figure 2:
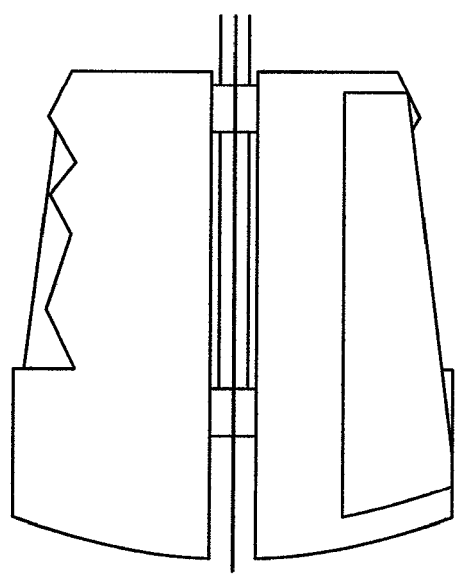
FIG. 2 shows Supermix blade (trademark: manufactured by Satake Kagaku Kogyo K.K.)

As the agitating blade, there may be used anchor blade, Maxblend blade, Sunmeller blade, Supermix blade, etc. Examples thereof are as shown in FIG. 1 and FIG. 2. The portion of the agitating blade facing the bottom of the tank may be dented at the center of the agitating shaft. The agitation shaft may be provided with a plurality of agitating blades in upper and lower direction.

The diameter (d) of the agitating blade is preferably 40-90%, more preferably 60-85% of the inner diameter (D) of the tank for more efficiently effecting the contact of the transition metal compound and the co-catalyst component.

The agitation shaft is suspended in such a manner that the agitating blade is close to the bottom of the polymerization reaction tank, and the distance between the lower end portion of the agitating blade and the bottom wall of the tank is preferably 10% or less, more preferably 5% or less of the inner diameter (D) of the tank for more efficiently carrying out the contact of the transition metal compound and the co-catalyst component. The distance between the lower end portion of the agitating blade and the bottom wall of the tank is usually 1% or more of the inner diameter (D) of the tank.

The polymerization reaction tank is provided with a transition metal compound feed opening and a co-catalyst component feed opening, and the transition metal compound and the co-catalyst component are separately fed into the polymerization reaction tank. The transition metal compound and the co-catalyst component are fed at positions of the bottom of the polymerization reaction tank which are at a distance of less than 0.5×d, preferably not more than 0.4×d from the center of the agitation shaft where d denotes the diameter of the agitating blade. Furthermore, the position to which the transition metal compound is fed and the position to which the co-catalyst component is fed are preferably on concentric circles the center of which is the center of the agitation shaft.

The polymerization reaction tank is provided with an olefinic monomer feed opening, from which the olefinic monomer is fed into the polymerization reaction tank. The feed position of the olefinic monomer is preferably the bottom of the tank, and more preferably on a concentric circle the center of which is the center of the agitation shaft and the center of the concentric circles on which the transition metal compound feed position and the co-catalyst component feed position are present.

The polymerization reaction tank is provided with a solvent feed opening, from which the solvent is fed into the polymerization reaction tank. The feed position of the solvent is preferably on the bottom of the tank, and more preferably on a concentric circle the center of which is the center of the agitation shaft and the center of the concentric circles on which the transition metal compound feed position and the co-catalyst component feed position are present.

The olefinic monomer may be fed to the polymerization reaction tank as a mixture of olefinic monomer/solvent, and in this case, the olefinic monomer feed opening and the solvent feed opening may be the same or the olefinic monomer feed opening and the solvent feed opening are separately provided and a part of the olefinic monomer may be fed from the solvent feed opening into the polymerization reaction tank.

The polymerization reaction tank is provided with a reaction mixture draw opening. The position of drawing of the reaction mixture is usually at the wall or top of the tank.

According to the present invention, an olefinic monomer is continuously polymerized in a solvent in the presence of a polymerization catalyst obtained by subjecting a transition metal compound and a co-catalyst component to a contact treatment.

As the transition metal compounds, mention may be made of compounds having a ligand having a cyclopentadiene type anion skeleton. Specific examples of the compounds are metallocene compounds represented by the formula $R^1_k R^2_l R^3_m R^4_n M^1$ (wherein M represents a transition metal belonging to Group 4 of the periodic table (such as zirconium, titanium or hafnium), $R^1$ represents a ligand having a cyclopentadiene type anion skeleton, $R^2$, $R^3$ and $R^4$ each represent a ligand having a cyclopentadiene type anion skeleton, an alkyl group, a cycloalkyl group, an aryl group, an aralkyl group, an alkoxy group, an aryloxy group, a halogen atom or a hydrogen atom, and k and l each represent an integer of 1 or more, and k+l+m+n=4). Examples of the metallocene compounds are bis(cyclopentadienyl)diethyltitanium, bis(cyclopentadienyl)dimethyltitanium, bis(pentamethylcyclopentadienyl)dimethyltitanium, bis(cyclopentadienyl) dichlorotitanium, bis(cyclopentadienyl)titanium monochloride monohydride, bis(indenyl)titanium monochloride monohydride, bis(indenyl)titanium dichloride, ethylenebis(indenyl)dimethyltitanium, ethylenebis(indenyl)methyltitanium chloride, ethylenebis(indenyl)titanium dichloride, ethylenebis(4,5,6,7-tetrahydro-1-indenyl) titanium dichloride, ethylenebis(4,5,6,7-tetrahydro-1-indenyl)dimethyltitanium, ethylenebis(4-methyl-1-indenyl) titanium dichloride, ethylenebis(2,3-dimethyl-1-indenyl) titanium dichloride, bis(cyclopentadienyl)diethyltitanium, bis(cyclopentadienyl)dimethylzirconium, bis(pentamethylcyclopentadienyl)dimethylzirconium, bis(cyclopentadienyl) dichlorozirconium, bis(cyclopentadienyl)zirconium monochloride monohydride, bis(indenyl)zirconium monochloride monohydride, bis(indenyl)zirconium dichloride, ethylenebis(indenyl)dimethylzirconium, ethylenebis (indenyl)methylzirconium dichloride, ethylenebis(indenyl) zirconium dichloride, ethylenebis(4,5,6,7-tetrahydro-1-indenyl)zirconium dichloride, ethylenebis(4,5,6,7-tetrahydro-1-indenyl)dimethylzirconium, ethylenebis(4-methyl-1-indenyl)zirconium dichloride, ethylenebis(2,3-dimethyl-1-indenyl)zirconium dichloride, etc.

The transition metal compounds further include vanadium compounds. Examples of the vanadium compounds are those which are represented by the formula $VO(OR)_n X_{3-n}$ (wherein R represents a hydrocarbon group, X represents a halogen atom, and n is a numeral of 0-3), and more specific examples are $VOCl_3$, $VO(OCH_3)Cl_2$, $VO(OCH_3)_2Cl$, $VO(OCH_3)_3$, $VO(OC_2H_5)Cl_2$, $VO(OC_2H_5)_2Cl$, $VO(OC_2H_5)_3$, $VO(OC_3H_7)Cl_2$, $VO(OC_3H_7)_2Cl$, $VO(OC_3H_7)_3$ or mixtures thereof. Of these vanadium compounds, those of the above formula in which n is 0-1 are preferred.

As the co-catalyst components, mention may be made of organoaluminumoxy compounds, organoaluminum compounds, boron compounds, etc.

Examples of the organoaluminumoxy compounds are tetramethyldialuminoxane, tetraethyldialuminoxane, tetrabutyldialuminoxane, tetrahexyldialuminoxane, methylaluminoxane, ethylaluminoxane, butylaluminoxane, hexylaluminoxane, etc.

Examples of the organoaluminum compounds are trimethylaluminum, triethylaluminum, tri-n-butylaluminum, triisobutylaluminum, tri-n-hexylaluminum, diisobutylhexylaluminum, diisobutyloctylaluminum, isobutyldihexylaluminum, isobutyldioctylaluminum, etc.

Examples of the boron compounds are tris(pentafluorophenyl)borane, triphenylcarbeniumtetrakis(pentafluorophenyl)borate, tri(n-butyl)ammoniumtetrakis(pentafluorophenyl)borate, N,N-dimethylaniliniumtetrakis (pentafluorophenyl)borate, etc.

Examples of the olefinic monomers are α-olefins such as ethylene, propylene, 1-butene, 1-pentene, 4-methyl-1-pentene, 5-methyl-1-hexene, 1-hexene, 1-heptene and 1-octene; non-conjugated dienes such as 1,5-hexadiene, 1,4-hexadiene, 1,4-pentadiene, 1,5-heptadiene, 1,6-heptadiene, 5-ethylidene-2-norbornene, dicyclopentadiene, 5-vinyl-2-norbornene and norbornadiene; conjugated dienes such as 1,3-butadiene, isoprene, 1,3-hexadiene, 1,3-octadiene, 1,3-cyclooctadiene and 1,3-cyclohexadiene; etc.

These olefinic monomers are used each alone or in combination of two or more, and when they are used in combination of two or more, the combinations include propylene/ethylene, propylene/1-butene, propylene/ethylene/1-butene, etc.

As the solvents, there may be used inert solvents, for example, aliphatic hydrocarbons such as propane, butane, isobutane, pentane, hexane, heptane and octane; alicyclic hydrocarbons such as cyclopentane and cyclohexane; and the like. Furthermore, olefinic monomers such as propylene and butane may also be used as the solvents.

In the present invention, the polymerization is carried out by agitating the reaction mixture, and as for agitation conditions, the agitation is carried out in such a manner that the Reynolds number for agitation is preferably 100 or more, more preferably 500 or more. Usually, the agitation is carried out in such a manner that the Reynolds number for agitation is 1000 or less.

The Reynolds number for agitation is a value defined by the following formula.

$$Re = d \times (n/60) \times \rho/\mu$$

Re: Reynolds number for agitation
d: diameter of blade (m)
n: the number of revolution in agitation (rpm)
ρ: density of liquid (kg/m$^3$)
μ: viscosity of liquid (Pa·s)

The polymerization temperature is usually −20 to 200° C., preferably 0 to 150° C., more preferably 20 to 120° C. The polymerization pressure is usually 0.1-10 MPa, preferably 0.1-5 MPa, more preferably 0.1-3 MPa.

EXAMPLES

The present invention will be explained below by the following examples and comparative examples.

Example 1

The flowing state of materials in a polymerization reaction tank of 25.6 m$^3$ in volume which had a transition metal compound (catalyst A) feed opening, a co-catalyst component (catalyst B) feed opening, and an olefinic monomer/solvent mixture feed opening at the bottom portion of the tank and a reaction mixture draw opening at the wall surface of tank and in which an agitation shaft provided with Maxblend blade wherein the portion of the blade facing the bottom of the tank is dented at the center of the blade and the width of the dented portion is 0.22×d where d denotes a diameter of the blade (trademark: manufactured by Sumiju Kiki System Co., Ltd.) shown in FIG. 1 was suspended in the central part of the tank was calculated by simulation soft (FLUENT 6. 2. 16). The calculation conditions were set as shown below and the frequency distribution of the weight ratio of catalyst B/catalyst A in the polymerization reaction tank was calculated every 0.01, and change in time was calculated.

The distance of the catalyst A feed opening from the center of the agitation shaft: 0.36×d (where d is a diameter of the blade)

The distance of the catalyst B feed opening from the center of the agitation shaft: 0.36×d (where d is a diameter of the blade)

The distance of the olefinic monomer/solvent mixture feed opening from the center of the agitation shaft: 0.36×d (where d denotes a diameter of the blade)

Catalyst A: density 670 (kg/m$^3$), viscosity 0.3 (mPa·s), flow rate 520 (kg/hr)

Catalyst B: density 670 (kg/m$^3$), viscosity 0.3 (mPa·s), flow rate 480 (kg/hr)

Olefinic monomer/solvent mixture: density 560 (kg/m$^3$), viscosity 0.114 (mPa·s), flow rate 23800 (kg/hr)

Agitation conditions: density of liquid 573 (kg/m$^3$), viscosity of liquid 2 (Pa·s), Reynolds number for agitation 740

When the fed catalysts A and B were completely mixed, the weight ratio of catalyst B/catalyst A was 480/520=0.92. From the results of calculation, values obtained by integrating the frequency distribution in the case of the weight ratio of catalyst B/catalyst A being 0.92±0.1 are shown in Table 1. It can be seen that the catalyst A and the catalyst B promptly mixed with each other after they were fed to the polymerization reaction tank as compared with in Comparative Example 1.

Comparative Example 1

Calculation was carried out in the same manner as in Example 1, except that the calculation conditions were changed as shown below. Values obtained by integrating the frequency distribution in the case of the weight ratio of catalyst B/catalyst A being 0.92±0.1 are shown in Table 1.

The distance of the catalyst A feed opening from the center of the agitation shaft: 0.58×d (where d is a diameter of the blade)

The distance of the catalyst B feed opening from the center of the agitation shaft: 0.58×d (where d is a diameter of the blade)

The position of the reaction mixture draw opening: at the position of bottom part of the tank corresponding to the center of the agitation shaft

TABLE 1

| Time | Example 1 | Comparative Example 1 |
|---|---|---|
| After 5 seconds | 10.8% | 2.0% |
| After 10 seconds | 78.5% | 18.8% |
| After 15 seconds | 87.0% | 25.6% |
| After 20 seconds | 89.3% | 31.3% |

Example 2

The same procedure as in Example 1 was repeated except that, as an agitating blade, there was used Maxblend blade wherein the portion of the blade facing the bottom of the tank is not dented at the center of the blade (trademark: manufactured by Sumiju Kiki System Co., Ltd.). Values obtained by integrating the frequency distribution in the case of the weight ratio of catalyst B/catalyst A being 0.92±0.1 are shown in Table 2.

Example 3

The same procedure as in Example 1 was repeated except that, as an agitating blade, there was used Maxblend blade wherein the portion of the blade facing the bottom of the tank is dented at the center of the blade and the width of the dented portion is 0.37×d where d denotes a diameter of the blade (trademark: manufactured by Sumiju Kiki System Co., Ltd.). Values obtained by integrating the frequency distribution in the case of the weight ratio of catalyst B/catalyst A being 0.92±0.1 are shown in Table 2.

TABLE 2

| Time | Example 2 | Example 3 |
|---|---|---|
| After 5 seconds | 13.9% | 5.8% |
| After 10 seconds | 88.0% | 84.8% |
| After 15 seconds | 90.4% | 88.1% |
| After 20 seconds | 91.2% | 88.6% |

Comparative Example 2

Calculation was carried out in the same manner as in Example 1, except that the calculation conditions were changed as shown below. Values obtained by integrating the frequency distribution in the case of the weight ratio of catalyst B/catalyst A being 0.92±0.1 are shown in Table 3.

The distance of the catalyst A feed opening from the center of the agitation shaft: 0.58×d (where d is a diameter of the blade)

The distance of the catalyst B feed opening from the center of the agitation shaft: 0.58×d (where d is a diameter of the blade)

TABLE 3

| Time | Comparative Example 2 |
|---|---|
| After 5 seconds | 1.7% |
| After 10 seconds | 29.7% |
| After 15 seconds | 74.4% |
| After 20 seconds | 83.1% |

The invention claimed is:

1. A process for producing an olefin polymer which comprises continuously polymerizing an olefinic monomer in the presence of a polymerization catalyst obtained by contact treatment of a transition metal compound and a co-catalyst component in a polymerization reaction tank in which an agitation shaft having an agitating blade is suspended in the central part of the tank, wherein the agitating blade is disposed close to the bottom surface of the polymerization reaction tank at a distance between the lower end portion of the agitating blade and the bottom surface of the polymerization reaction tank of 0.1×D or less where D is the diameter of the polymerization reaction tank, the transition metal compound and the co-catalyst component are respectively fed to the positions of the bottom of the polymerization reaction tank which are at a distance of 0.5×d or less from the center of the agitation shaft where d is a diameter of the agitating blade, and the agitation is carried out at a Reynolds number for agitation of 100 or more.

2. A process for producing an olefin polymer according to claim 1, wherein the distance between the bottom surface of the polymerization reaction tank and the lower end portion of the agitating blade is 0.05×D or less where D is the diameter of the polymerization reaction tank.

3. A process for producing an olefin polymer according to claim 1 or 2, wherein the transition metal compound is a compound having a ligand having a cyclopentadiene anion skeleton.

* * * * *

UNITED STATES PATENT AND TRADEMARK OFFICE
CERTIFICATE OF CORRECTION

PATENT NO.         : 7,504,462 B2                                    Page 1 of 1
APPLICATION NO. : 12/021513
DATED              : March 17, 2009
INVENTOR(S)        : Hisakatsu Hama It is certified that error appears in the above-identified patent and that said Letters Patent is hereby corrected as shown below:

Title Page; item (73);

On the face of the patent, please amend the Assignee's name as follows:

Assignee:   Sumitomo ~~Cheimcal~~ <u>Chemical</u> Company,
            Limited, Tokyo (JP)

Signed and Sealed this

Fourth Day of August, 2009

JOHN DOLL
*Acting Director of the United States Patent and Trademark Office*